Feb. 18, 1964     R. C. BRENTRUP     3,121,782
DOMESTIC ELECTRIC COOKING APPLIANCE
Filed Nov. 13, 1961     3 Sheets-Sheet 1

INVENTOR.
Robert C. Brentrup
BY
Lloyd M. Keighley
HIS ATTORNEY.

Feb. 18, 1964  R. C. BRENTRUP  3,121,782
DOMESTIC ELECTRIC COOKING APPLIANCE
Filed Nov. 13, 1961  3 Sheets-Sheet 2

INVENTOR.
Robert C. Brentrup
BY
Lloyd M. Keighley
HIS ATTORNEY.

Feb. 18, 1964  R. C. BRENTRUP  3,121,782
DOMESTIC ELECTRIC COOKING APPLIANCE
Filed Nov. 13, 1961  3 Sheets-Sheet 3

INVENTOR.
Robert C. Brentrup
BY
Lloyd M. Keighley
HIS ATTORNEY.

Figure 2:
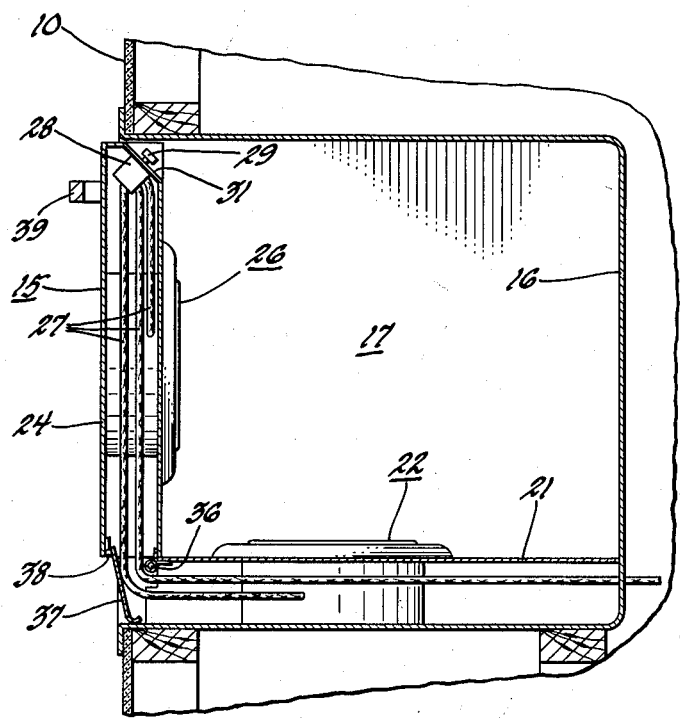
Figure 4:
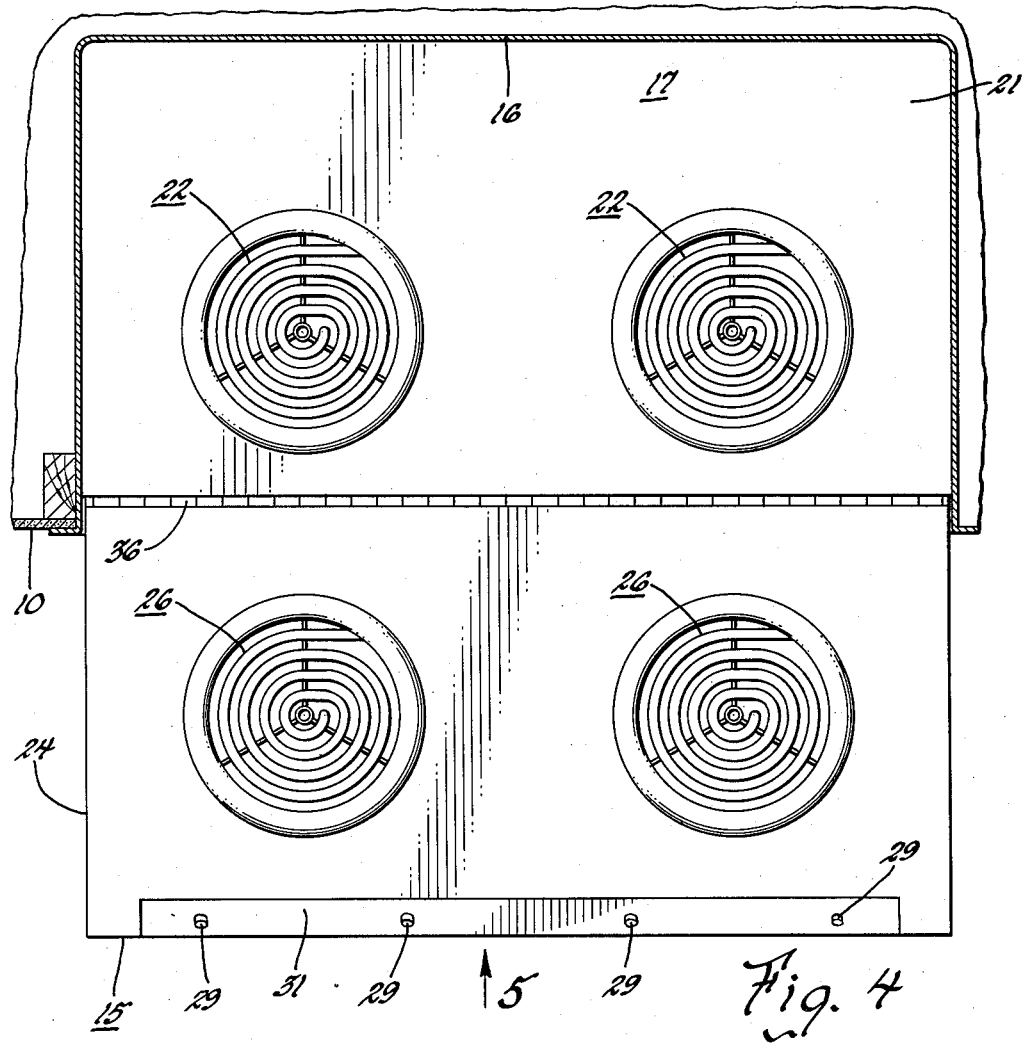
Figure 5:
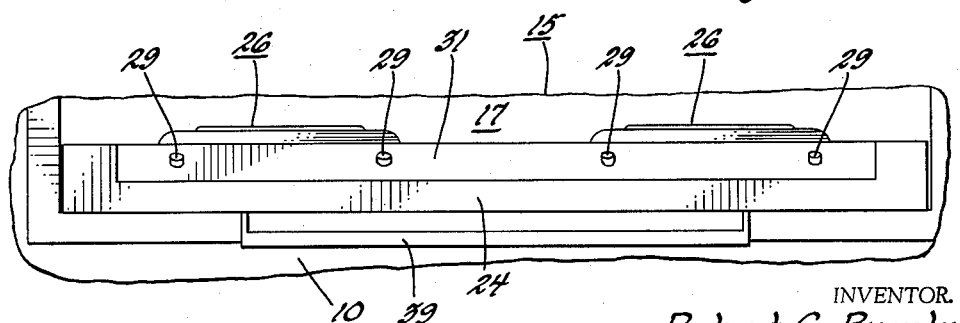

United States Patent Office 3,121,782

Patented Feb. 18, 1964

3,121,782

DOMESTIC ELECTRIC COOKING APPLIANCE

Robert C. Brentrup, Royal Oak, Mich., assignor to General Motors Corporation, Detroit, Mich., a corporation of Delaware Filed Nov. 13, 1961, Ser. No. 151,935

2 Claims. (Cl. 219—37)

This invention relates to domestic appliances and particularly to swingable or so-called fold-down cooking devices including surface heater units upon which vessels are supported and directly heated by the units.

It is an object of my invention to provide an improved, unique and practical unitary sectional cooking structure having a plurality of surface heater units carrying or supporting sections for association with a cavity in an upright kitchen wall.

Another object of my invention is to render a space in a cavity of a wall in which a fold-down surface heater unit cooking device is installed usable as a storage area or compartment therein while the device is not being employed to cook food products.

A further object of my invention is to provide a fold-down kitchen wall installable unitary sectional cooking device structure which, in addition to exposing and rendering usable a surface heater unit carried by a first movable or fold-down section of the structure, also exposes and renders usable another surface unit on a second stationary or fixed section of the structure in back of and on substantially a horizontal plane with the movable section whereby sections thereof define complemental parts of a contiguous cooking ledge associated with a cavity in the wall elevated above the kitchen floor.

A still further object of my invention is to provide a unitary sectional cooking device structure having multiple surface heater units and control means therefor embodied therein normally concealed within a cavity of a kitchen wall by a door section of the structure which closes the cavity opening with another section of the structure fixed in a horizontal plane in the cavity serving to support articles in the device while the door section thereof is closed.

In carrying out the foregoing objects it is a more specific object of my invention to provide a wall installable-type cooking device having a surface heater unit supporting section fixed or stationarily secured in a horizontal position within a cavity of a wall and a movable surface heater unit carrying section hinged or pivoted to the fixed section normally disposed at a right angle with respect thereto forming a door thereon to close the cavity opening in which the device is mountable and to conceal the heater units from view within a kitchen when the door section thereof is not projected from the wall for cooking purposes.

Additional objects and advantages of the present invention will be apparent from the following description, reference being had to the accompanying drawings whereing a preferred embodiment of the present invention is clearly shown.

In the drawings:

FIGURE 1 is a fragmentary view of a kitchen upright wall showing a unitary cooking device constructed in accordance with my invention associated therewith and mounted in a cavity therein elevated above the floor thereof;

FIGURE 2 is an enlarged vertical fragmentary sectional view taken on the line 2—2 of FIGURE 1 showing a movable or door section of my unitary cooking device structure closing the cavity in the kitchen wall;

FIGURE 3 is a view similar to FIGURE 2 showing the door section of the unitary cooking device structure lowered with respect to a stationarily secured section thereof to render surface heater units on each section of the structure usable at the front of the kitchen wall;

FIGURE 4 is a horizontal fragmentary sectional view taken on the line 4—4 of FIGURE 3 showing sections of the unitary structure forming complemental parts of a contiguous cooking ledge associated with the kitchen wall; and FIGURE 5 is a view taken in the direction of the arrow 5 in FIGURE 4 showing controls within an edge portion of the door or movable section of the unitary cooking device structure.

Referring to the drawings, for illustrating the invention, I show in FIGURE 1 thereof a portion of a kitchen or the like upright wall 10 having an aperture or cavity therein elevated above the floor 11 of the kitchen at a desired level substantially corresponding to the height of the work ledges usually present in kitchens. A cooking range construction is disposed in and rigidly anchored within the cavity of the kitchen wall 10 and this range may include an insulated baking or roasting oven normally closed by a swingable door 12. The oven may be provided with suitable or conventional heating elements, preferably electrically energized, and controlled by switches having operating knobs or the like 13 exposed to the interior of the kitchen and located on a control panel associated with the oven door 12. The present range construction includes a unitary cooking device structure, generally represented by the reference numeral 15 in FIGURE 1, which can be mounted conjointly with the range construction at a side thereof or separately therefrom, if desired, within another cavity or aperture provided therefor in the kitchen wall 10. This cooking device 15 comprises a unitary structure including a box-like cavity liner element 16 rigidly secured within the cavity of wall 10 in any suitable or conventional fashion to provide a chamber 17 therein and a sectional contrivance including a first substantially hollow metal section or member 21 stationarily carried by liner 16 in a horizontal position or plane at the base portion of cavity liner 16 (see FIGURE 2). The top wall of stationary section 21 of the unitary cooking device structure 15 is provided with spaced-apart apertures each having an electrically energizable surface heater unit or units disposed or mounted therein and generally represented by the reference numeral 22. Heater units 22 may be of any suitable or conventional construction as is well known to those skilled in the art and are adapted to have vessels such as pots, kettles, skillets or the like supported thereon for cooking contents thereof by direct contact therewith. The sectional contrivance of unitary cooking device structure 15 also comprises a movable substantially hollow metal section or member 24 which is hingedly or pivotally mounted to or upon a front portion of the stationary section 21 thereof. While I have disclosed the liner or housing element 16 as a part of unitary structure 15 with the movable or door forming section 24 thereof closing chamber 17 the element 16 is not essential to the present invention since the objects hereinbefore set forth can be accomplisheed without its inclusion. For example, structure 15 may comprise only the sections 22 and 24 so long as the movable section 24 is utilized as a door for closing the opening of the cavity in wall 10. The movable section 24 of device 15 is provided in the inner face thereof with spaced-apart apertures each also having an electric surface heater unit or units 26, similar to units 22, disposed therein and carried thereby. The lower portion of each of these surface heater units 22 and 26 is preferably enclosed within a shroud or shell located intermediate and secured to opposed walls of members or sections 21 and 24 respectively for increasing their structural strength. Heater units 22 and 26 have wire connections 27 to a source of electric current supply through switches 28 carried by the movable section 24 of unitary structure 15 each having an actuating knob, button, lever or the like 29 located in an edge portion 31 of this section for controlling the switches and energizing the heaters to different heating intensities (see FIGURES 2 and 5). The edge portion 31 of movable section 24 is recessed intermediate corners thereof and provides an angular mounting surface therealong for the controls 29 of switches 28.

Figure 1:
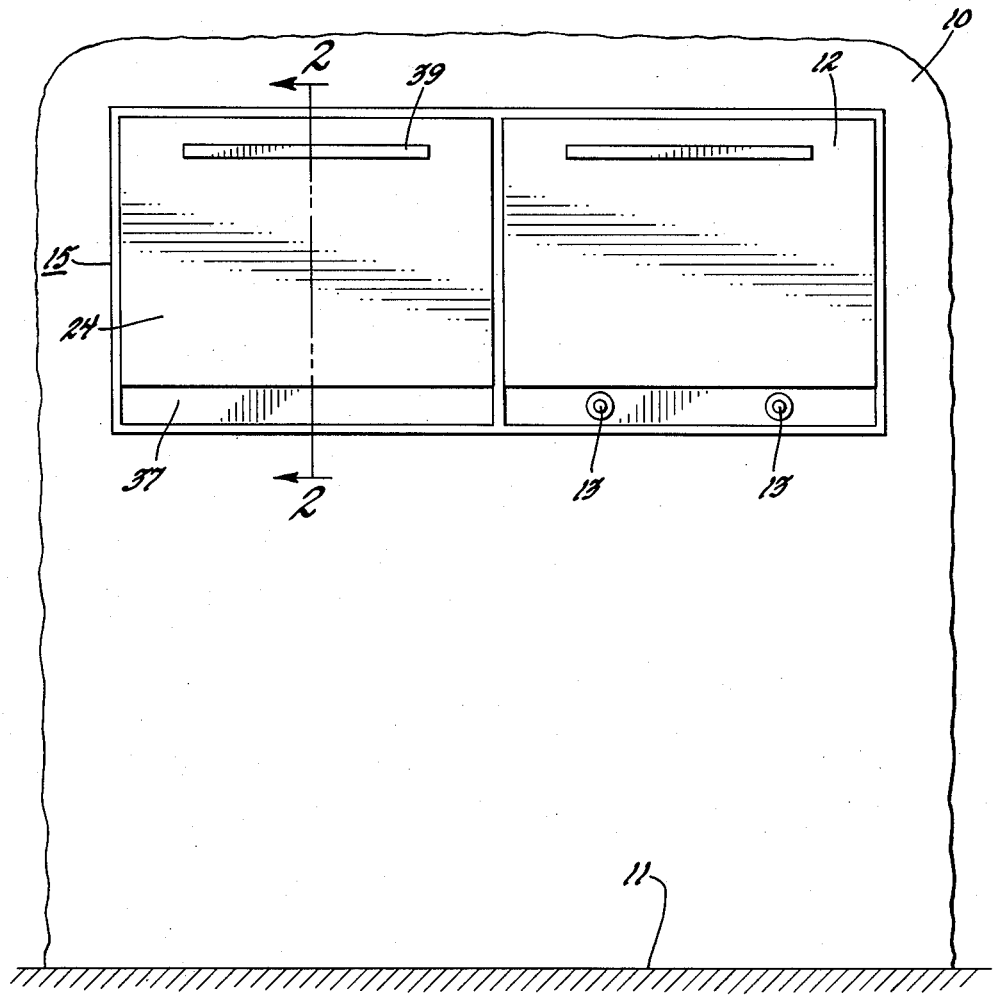

Sections or members 21 and 24 of the sectional contrivance of unitary cooking device structure 15 are rectangular in shape and are pivotally attached to one another by a piano or the like hinge means 36. A plate 37 is hinged to movable section 24 by small spaced-apart suitable or conventional spring pressed hinges 38 and this plate is biased by the spring of hinges 38 against the forward portion of the lower wall part of stationary section 21. Plate 37 provides a cover at the juncture between the hinged-together sections 21 and 24, particularly while section 24 forms a door on the structure 15 closing the cavity opening in wall 10 and chamber 17, and serves to conceal edges of the section and the wires 27 extended from stationary section 21 into the movable or hingedly mounted door forming section 24 of the unitary structure. The hinging arrangement of door or movable section 24 onto fixed section 21 of structure 15 is such that any suitable or desirable latch means or mechanism (not shown) can be employed to normally hold door section 24 closed, to cover the cavity in wall 10 and close chamber 17. Section 24 of the structure is, while same is in a normal closed position, disposed at a right angle with respect to fixed or stationary section 21 thereof. It is to be noted that the heater unit switch controls 29 located at the angled surface 31 of door section 24 of structure 15 and the heater units 22 and 26 are concealed from view interiorly of the kitchen within the cooking device or chamber 11. It is also to be noted that, with members or sections 21 and 24 latched or held in their right angled position as shown in FIGURES 1 and 2 of the drawings, the space intermediate the back face of section 24 and the rear wall of cavity liner 16 or chamber 17 may, if desired, be utilized as a convenient storage area within the kitchen wall 10 or within the unitary structure 15 for supporting cooking containers or vessels and other articles on the first or stationarily secured section 21 of the structure. Cover plate 37 forms a continuation of the outer surface of door section 24 to close the gap between sections 21 and 24 of the structure at the hinged juncture thereof (see FIGURE 2). A handle 39 on movable door section 24 of structure 15 is utilized to swing this movable section about its hinged mounting means 36 relative to the stationarily secured or fixed section 21 thereof.

Figure 3:
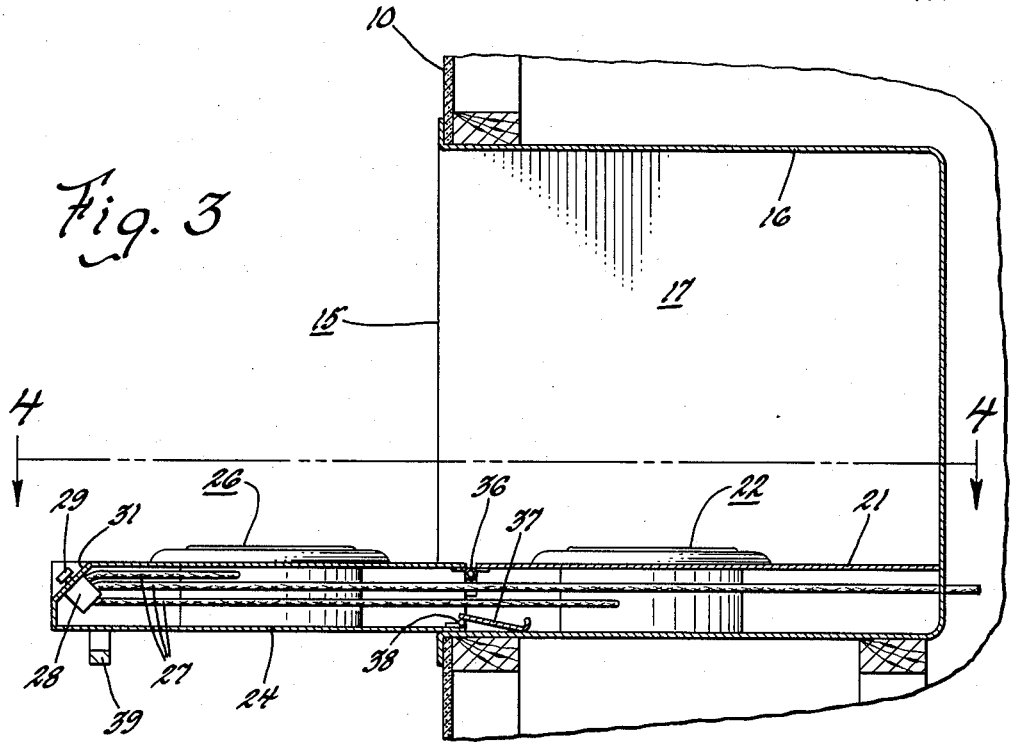

Assume now that it is desired to cook a food product contained in a vessel to be supported directly upon one of the heater units of the cooking device. Handle 39 is grasped by the hand and an outward force is applied thereto and to door section 24 of the unitary structure 15. This force swings rectangular door section 24 outwardly and downwardly about its hinge mounting means 36 from the position thereof shown in FIGURE 2 of the drawings into a substantially horizontal position as shown in FIGURE 3 at a right angle with respect to kitchen wall 10 in front of and aligned with the fixed section 21 to expose all of the surface heater units 22 and 26, as well as the controls 29 therefor, to the interior of the kitchen and render them usable therein. Door section 24 of the structure is supported in an open horizontal position by hinge means 36 and by engagement of a portion of this section with the front edge of section 21. Chamber 11 in the kitchen wall may, during use of device 15 for cooking purposes, be vented by a fan or blower through a suitable air duct system incorporated in a false wall part or soffit of the kitchen for carrying away odors of foods being cooked on the units 22 and 26. As the second or door section 24 of structure 15 is swung or pivoted into the position just described, the free edge of spring biased cover plate 37 bears against and slides along the surface of liner 16 and moves into the hollow rectangular fixed section 21 of the structure (see FIGURE 3). The edges of sections 21 and 24 adjacent the hinged juncture therebetween are disposed in close proximity to one another when these sections are aligned horizontally and their top surfaces define complemental parts of a contiguous cooking ledge extending along the unitary structure 15 into chamber 11 and outwardly thereof beyond kitchen wall 10 so as to resemble a four burner or surface cooking unit top of a large self-standing range. Whenever unitary structure 15 is not to be used as a cooking device, door section 24 thereof is moved into a vertical closed position to again conceal its heater units and the controls therefor from view within the kitchen.

It should be apparent from the foregoing that a unitary cooking device structure having the unique sectional contrivance provided by my invention is of an improved character and has advantages over former such structures. The arrangement for concealing elements of a kitchen wall installable cooking device as herein disclosed improves the overall appearance of the interior of a kitchen. The unitary cooking device structure, while seemingly of a small character, is not in reality of increased capacity over former fold-down devices and serves the purpose of a large multiple surface heater unit top of a free standing range cabinet without occupying valuable floor area in a kitchen. The present structure is more to the liking of certain housewives who prefer to use back or remote surface heater units for slow cooking or simmering of stews, etc. as compared to faster cooking of food products on units nearer the front of a multiple cooking ledge. My improved device also contemplates, if desired, the boiling or stewing of food products in containers supported on units of the stationary section thereof while its door forming section closes the chamber therein or the cavity opening in the kitchen wall.

While the embodiment of the present invention as herein disclosed constitutes a preferred form, it is to be understood that other forms might be adopted.

What is claimed is as follows:
1. A cooking device including:
   (a) a unitary box-like structure having closed walls forming a chamber therein adapted to be fixedly secured within a cavity provided in an upright partition of a kitchen elevated above the floor thereof and accessible only through a front opening in the structure,
   (b) said unitary structure comprising a horizontal base section and a single door section pivotally mounted upon said base section normally paralleling the upright kitchen partition and closing the front opening of said chamber,
   (c) a first surface heater unit carried by and movable with said door section and a second surface heater unit located in said base section of said structure,
   (d) the closed walls of said unitary box-like structure being concealed in the cavity by the kitchen partition and said door section thereof concealing both of said heater units within said chamber,
   (e) said door section being swingable downwardly relative to said base section of said structure into a right angled supported position with respect thereto whereby said sections define complemental portions of a contiguous ledge extending outwardly beyond the kitchen partition and inwardly thereof into said chamber,
   (f) said heater units being upon swinging said door section disposed one in back of the other at the top of said ledge and exposed to the interior of the kitchen forwardly of the partition thereof, and
   (g) said heater units being selectively and/or simultaneously usable for cooking substances within receptacles placed directly thereon while said door sec- tion of the unitary box-like structure is opened into its said right angled position.

2. A cooking device including:
(a) a unitary box-like structure having closed walls forming a chamber therein adapted to be fixedly secured within a cavity provided in an upright partition of a kitchen elevated above the floor thereof and accessible only through a front opening in the structure,
(b) said unitary structure comprising a horizontal base section and a single door section pivotally mounted upon said base section normally paralleling the upright kitchen partition and closing the front opening of said chamber,
(c) a first electric surface heater unit carried by and movable with said door section and a second electric surface heater unit located in said base section of said structure,
(d) the closed walls of said unitary box-like structure being concealed in the cavity by the kitchen partition and said door section thereof concealing both of said heater units within said chamber,
(e) manually actuatable control means for each of the electric heater units on said door section of the structure and concealed thereby within said chamber when the door section is closed concealing said heater units therein,
(f) said door section being swingable downwardly relative to said base section of said structure into a right angled supported position with respect thereto whereby said sections define complement portions of a contiguous ledge extending outwardly beyond the kitchen partition and inwardly thereof into said chamber,
(g) said control means being exposed at the front of said ledge upon swinging said door section,
(h) said heater units being upon swinging said door section disposed one in back of the other at the top of said ledge and exposed to the interior of the kitchen forwardly of the partition thereof, and
(i) said heater units being selectively and/or simultaneously usable for cooking substances within receptacles placed directly thereon while said door section of the unitary box-like structure is opened into its said right angled position.

References Cited in the file of this patent
UNITED STATES PATENTS

| | | |
|---|---|---|
| 2,109,006 | Davis | Feb. 22, 1938 |
| 2,811,628 | Gottfried | Oct. 29, 1957 |

FOREIGN PATENTS

| | | |
|---|---|---|
| 137,026 | Australia | Apr. 24, 1950 |